(12) United States Patent
Gillingham et al.

(10) Patent No.: US 8,023,434 B2
(45) Date of Patent: Sep. 20, 2011

(54) ARRANGEMENTS FOR AUTO-MERGING AND AUTO-PARTITIONING PROCESSING COMPONENTS

(75) Inventors: Marlene J. Gillingham, Bellevue, WA (US); Karen A. Taylor, Carnation, WA (US); Steven J. Zaharias, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 11/856,827

(22) Filed: Sep. 18, 2007

(65) Prior Publication Data
US 2009/0073896 A1 Mar. 19, 2009

(51) Int. Cl.
*H04L 12/28* (2006.01)
(52) U.S. Cl. ......................... 370/255; 709/232
(58) Field of Classification Search .................. 370/255, 370/408; 709/232, 223, 227
See application file for complete search history.

(56) References Cited

U.S. PATENT DOCUMENTS

| | | | |
|---|---|---|---|
| 5,185,860 A | 2/1993 | Wu | |
| 5,457,797 A | 10/1995 | Butterworth et al. | |
| 5,522,075 A | 5/1996 | Robinson et al. | |
| 5,640,546 A | 6/1997 | Gopinath et al. | |
| 5,732,086 A | 3/1998 | Liang et al. | |
| 5,926,101 A * | 7/1999 | Dasgupta | 340/825.02 |
| 6,049,861 A | 4/2000 | Bird et al. | |
| 6,263,387 B1 | 7/2001 | Chrabaszcz | |
| 6,330,653 B1 | 12/2001 | Murray et al. | |
| 6,597,956 B1 | 7/2003 | Aziz et al. | |
| 6,625,274 B1 | 9/2003 | Hoffpauir et al. | |
| 6,654,747 B1 | 11/2003 | Van Huben et al. | |
| 6,895,443 B2 | 5/2005 | Aiken | |
| 6,976,068 B2 | 12/2005 | Kadam et al. | |
| 7,191,327 B2 * | 3/2007 | Viljoen et al. | 713/2 |
| 7,310,774 B1 | 12/2007 | Arquie et al. | |
| 7,640,503 B1 | 12/2009 | Jacquot et al. | |
| 2002/0038360 A1 | 3/2002 | Andrews et al. | |
| 2003/0018870 A1 | 1/2003 | Abboud et al. | |
| 2004/0073663 A1 | 4/2004 | Scarth | |
| 2004/0264422 A1 | 12/2004 | Calcev et al. | |
| 2005/0038808 A1 | 2/2005 | Kutch | |
| 2005/0081084 A1 * | 4/2005 | Lai et al. | 714/4 |
| 2005/0091396 A1 * | 4/2005 | Nilakantan et al. | 709/232 |
| 2005/0120030 A1 | 6/2005 | Varpela et al. | |
| 2005/0229173 A1 | 10/2005 | Mihm et al. | |
| 2006/0010133 A1 | 1/2006 | Bozek et al. | |
| 2006/0251072 A1 | 11/2006 | Hendel et al. | |
| 2007/0067435 A1 * | 3/2007 | Landis et al. | 709/224 |

OTHER PUBLICATIONS

Neeraj K Utreja, USPTO Filewrapper for U.S. Appl. No. 11/847,568 as of Apr. 22, 2011, (www.uspto.gov), Apr. 22, 2011, pp. 1-227, USPTO, USA.
Nicholas S Ulrich, USPTO Filewrapper for U.S. Appl. No. 11/856,809 as of Apr. 22, 2011, (www.uspto.gov), pp. 1-611, USPTO, USA.

* cited by examiner

*Primary Examiner* — Dang T Ton
*Assistant Examiner* — Wei Zhao
(74) *Attorney, Agent, or Firm* — Thomas E. Tyson; Schubert Law Group PLLC (57) ABSTRACT

In some embodiments, a method for auto-partitioning a scalable processing system is disclosed. The method can include establishing connection data, identifying a primary node and automatically transmitting partitioning commands to other nodes to configure them as secondary nodes. The partitioning commands can adjust the basic input output settings of the secondary nodes such that the system can boot as a single partitioned system. Other embodiments are also disclosed.

20 Claims, 3 Drawing Sheets

FIG. 1

|  |  | NODE A | | NODE B | | NODE C | | NODE D | |
|---|---|---|---|---|---|---|---|---|---|
|  |  | P1 | P2 | P1 | P2 | P1 | P2 | P1 | P2 |
| NODE A 00 | P1 | N | N |  | 01 |  |  |  |  |
|  | P2 | N | N |  |  |  | 02 |  |  |
| NODE B 01 | P1 |  | 07 | N | N |  |  | 04 |  |
|  | P2 |  |  | N | N |  |  |  | 05 |
| NODE C 10 | P1 |  |  | 03 |  | N | N |  |  |
|  | P2 |  |  |  |  | N | N |  |  |
| NODE D 11 | P1 |  | 06 |  |  |  |  | N | N |
|  | P2 |  |  |  |  |  |  | N | N |

ARRANGEMENTS FOR AUTO-MERGING AND AUTO-PARTITIONING PROCESSING COMPONENTS

FIELD

The present disclosure relates generally to computing systems and more particularly to auto-configuring multi-node computing systems.

BACKGROUND

As computing needs for organizations have increased, and as organizations plan for growth, one common way to plan for, and obtain economical computing is to purchase computing systems that are scalable. A system or architecture is scalable when it can be upgraded or increased in size or reconfigured to accommodate changing conditions. For example, a company that plans to set up a client/server network may want to have a system that not only works with the number of people who will immediately use the system, but also can be easily and economically expanded to accommodate the number of employees who may be using the system in one year, five years, or ten years. In another example, a company that runs a server farm and hosts web pages or applications via the Internet may continue to grow, and this company would desire a scalable system where they can economically add servers as needed to accommodate growth.

Accordingly, scalable server systems can merge or integrate a number of scalable servers or chasses having one or more processors to create a "larger" unitary system having processing nodes. Thus, a collection of scalable servers can function like a single larger server when properly merged. When multiple servers are merged they can be partitioned using hardware partitioning. A system with a single partition can run a single instance of an operating system (OS) and all the nodes of the system are thus conceptually combined. Thus, in effect, the user will experience a single, more powerful computing system, functioning as one "scaled up" node, instead of a number of less powerful nodes running independently.

A traditional approach for combining multiple nodes of a system into a single-partition merged system running a single instance of an OS is to have a trained technician manually integrate and configure each node as a system is built or as computing resources (nodes) are added. Traditionally, a trained technician or administrator must configure each node with the proper partition configuration information, entering data to specify or configure one of the nodes as the primary, or boot node, and the other nodes as secondary nodes to the primary node. This approach is cumbersome, and requires trained technicians to build and configure such a system. When there are more than a few nodes to manually configure, the configuring process can get complex and such configuring is prone to connection and configuration errors and omissions.

As stated above, one issue in scalable processing systems is that after the processing components are cabled together, each component must be configured such that all components can boot together and operate together in the desired configuration. Also, as stated above, in most systems the customer/user must manually designate one node as a primary node or a boot facilitator. This process may require that the primary node is capable of communicating with the other nodes, for example, the primary node as well as the secondary nodes must be "turned on" or "up and running." The "technician" configuring the system, has to know information about the connected nodes, addresses etc. and the technician typically has to manually enter that data into a user interface to describe which nodes should boot together etc. A typical customer setup is where all the components that are cabled together are desired to boot as a single entity, as a single partitioned system or as a system that runs a single operating system. Traditionally, many scalable server systems utilize a management interface (a standalone computing system with specialized hardware) to properly boot the connected server nodes. It can be appreciated that this approach requires costly dedicated hardware, and may require modification to preexisting systems that do not allow for the addition of such functionality.

In many scaled server systems, nodes can communicate with intelligent platform management interface (IPMI) commands. This protocol can be utilized to monitor server hardware components for temperature, voltage, chassis intrusion, etc. and can provide limited control for various system operations. The IPMI concept was introduced in 1998 by many major server producers. Generally, IPMI commands are a standard set of messages for the characteristics of hardware components such that servers can communicate and function together. Sensors in the system can provide data to a baseboard management controller (BMC), (a controller on a circuit board) which can send IPMI messages over the server's system bus to the network as well as over an independent, internal Platform Management Bus (IPMB).

Alternately described, an intelligent platform management interface (IPMI) can be understood as a hardware level interface specification that defines a common, abstracted, message-based interface to platform monitoring and control functions. As a hardware-level interface, the IPMI can reside at the bottom (the lowest level) of a typical management software stack.

"Power up" issues can also be a concern for scalable systems. One approach to address this issue is to have a "luck-of-the-draw" or timing-based approach programmed into the nodes of the system. When a node boots up, the node can determine whether a single-partition merged system is already running, and if so, the node can join the partition or system. If the node does not find a preexisting system or partition to join, it can start one, and become the primary node and create a "new system." The new node thus can become a primary node due to timing issues and the luck of the draw. Such an approach, however, can be complex, and often does not provide the administrator with control over which node becomes the primary node.

Generally, systems in a scalable environment do not automatically know that they are cabled together and can work as one system. These scalable systems have to be told (i.e. configured by a technician) such that they know that they are cabled to other nodes and must be configured regarding how they can communicate with other nodes. There are many current designs available that utilize this manual configuration approach. One design uses a network such as an Ethernet connection between nodes and utilizes dedicated hardware such as a remote supervisor adapter (RSA) to facilitate set up of the system.

The RSAs can communicate with each other on Ethernet (embedded service on each RSA) and can instruct the scalable components to work together with a set partitioning. This system, among other things, requires a user to input the Internet Protocol (IP) addresses of each RSA, in the RSA interface before the scalable systems can work as a single entity. This process can be cumbersome for a user to discover and enter the RSA IP address for each component. This IP detection process can include booting each scalable component and after the component is connected to the network the user can request and find the IP address in the BIOS menu of the component. Another traditional arrangement uses a service location protocol (SLP) discovery routine to detect all scalable components via the system's RSA Ethernet network connections. Then the arrangement can iterate through the list of SLP scalable systems and an application can send a message (ping) through each scalable system port and detect received messages on another scalable system port. Each scalable system relies on RSA Ethernet protocol to initiate and detect how other scalable systems interconnect. In the end, all scalable connections are determined for all SLP scalable systems.

This Ethernet based arrangement does not exchange comprehensive system information and such information can depend on the intercommunication of scalable components via RSA Ethernet. One solution utilizes SLP to discover the communication mechanism, which can find a large number of systems. Only the number of RSAs connected to that network limits the number of discovered systems. Often not all of these detected systems can be operated as a single identity. This can cause extra time filtering through the systems not capable of scalability.

Another approach is to connect the servers and configure virtual building blocks. These building blocks can be broken down to any level, but this is generally only supported in a Linux environment. These systems often utilize a relatively complex set-up procedure. Such a set up can also require extensive hardware and software overhead. Many traditional systems can require an Ethernet communication system to communicate set up commands to all of the subsystems. Further, it is expensive to require a trained technician be present at every installation or every system expansion.

SUMMARY

The problems identified above are in large part addressed by the systems, arrangements, methods and media disclosed herein to provide auto-partitioning of a multi-node processing system. In some embodiments, the method can include establishing connection data, identifying a primary node, and automatically transmitting partitioning commands to other nodes to configure them as secondary nodes. The partitioning commands can adjust the BIOS settings and board controller settings of the primary and secondary nodes such that the system boot as a single partition system.

In some embodiments, a method for auto-partitioning a processing system is disclosed. The method can include communicating with at least one node in a processing complex, receiving node connection data from at least one node, querying a node to verify at least a portion of the node connection data, and transmitting a default partition command indicating a boot node and a partition configuration. Such a partition command can reconfigure the basic input output system (BIOS) of each node that receives such a command. The partition command can also affect the power up sequence of nodes in the system. The method can also include identifying a primary boot node, where the primary boot node can transmit default partition commands to other board management controllers (BMCs) and BIOSs. The partition command can be in the form of an intelligent platform management interface (IPMI) command. The IPMI command can be an original equipment manufacturer (OEM) IPMI command. A secondary node can receive the partition command and can auto-configure the BIOS configuration of all connected secondary nodes such that secondary nodes allow the secondary nodes to be part of the auto-partitioned system.

Some embodiments provide an auto-partitioning method for a multi-node processing system. The method can include communicating with at least one node in a processing complex receiving node connection data from at least one node, determining a partition configuration, determining a primary node, and, configuring a partition in response to the node connection data and the primary node. The method can also include configuring a basic input/output system (BIOS) in response to the partition configuration, where the partition configuration can be a default single partition configuration. In other embodiments, the partition configuration can be user selected/user configured with any number of nodes. The BIOS can also be reconfigured when a new node is hot plugged, thus creating a different partition configuration.

In other embodiments, an apparatus is disclosed having a first processing component, a first communication port connected to the first processing component, and a baseboard management controller coupled to the first communication port, the baseboard management controller can automatically determine a default partition setting and a booting configuration and can automatically configure an operating configuration based on the default partition setting. In some embodiments, memory can be coupled to the baseboard management controller to store different operating configuration code and booting code to provide the default or desired operating configurations. The apparatus can also include a primary node identifier to identify nodes with a unique identity.

In another embodiment, a computer program product is disclosed that has a computer readable medium, wherein the computer readable medium, when executed on a computer, causes the computer to communicate with at least one node in a processing complex, receive node connection data from the node, determine a partition configuration, determine a primary node, and configure a partition in response to the node connection data and the primary node. In addition, the code, when executed on a computer, can cause the computer to configure a basic input output system in response to the partition configuration and can cause the computer to set up a default partition configuration based on the connection data and the primary node.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

A multi-node auto-partitioning scalable processing system is disclosed herein. As nodes are added to the processing system the nodes can be auto-merged and auto-partitioned to form a larger processing system that operates as a single entity. This auto-partitioning of multiple nodes into a single-partition (unitary) system can be accomplished via a baseboard management controller (BMC) at each node transmitting partition commands to other BMC's. After a primary node is selected, possibly via user input, a BMC of a primary node or possibly a remote supervisor adapter (RSA) can send an IPMI command that can be utilized by each BMC at each node to configure each node into a single partition. In some embodiments, the resources or merged nodes of the processing system or complex can be partitioned to run a single instance of an operating system (OS), and in other embodiments, the complex can be partitioned to run multiple instances of an operating system. The BMCs can determine an interconnection of nodes, automatically assign a primary node and then can automatically reconfigure the instruction set into a default partition configuration without human/user input.

Figure 1:
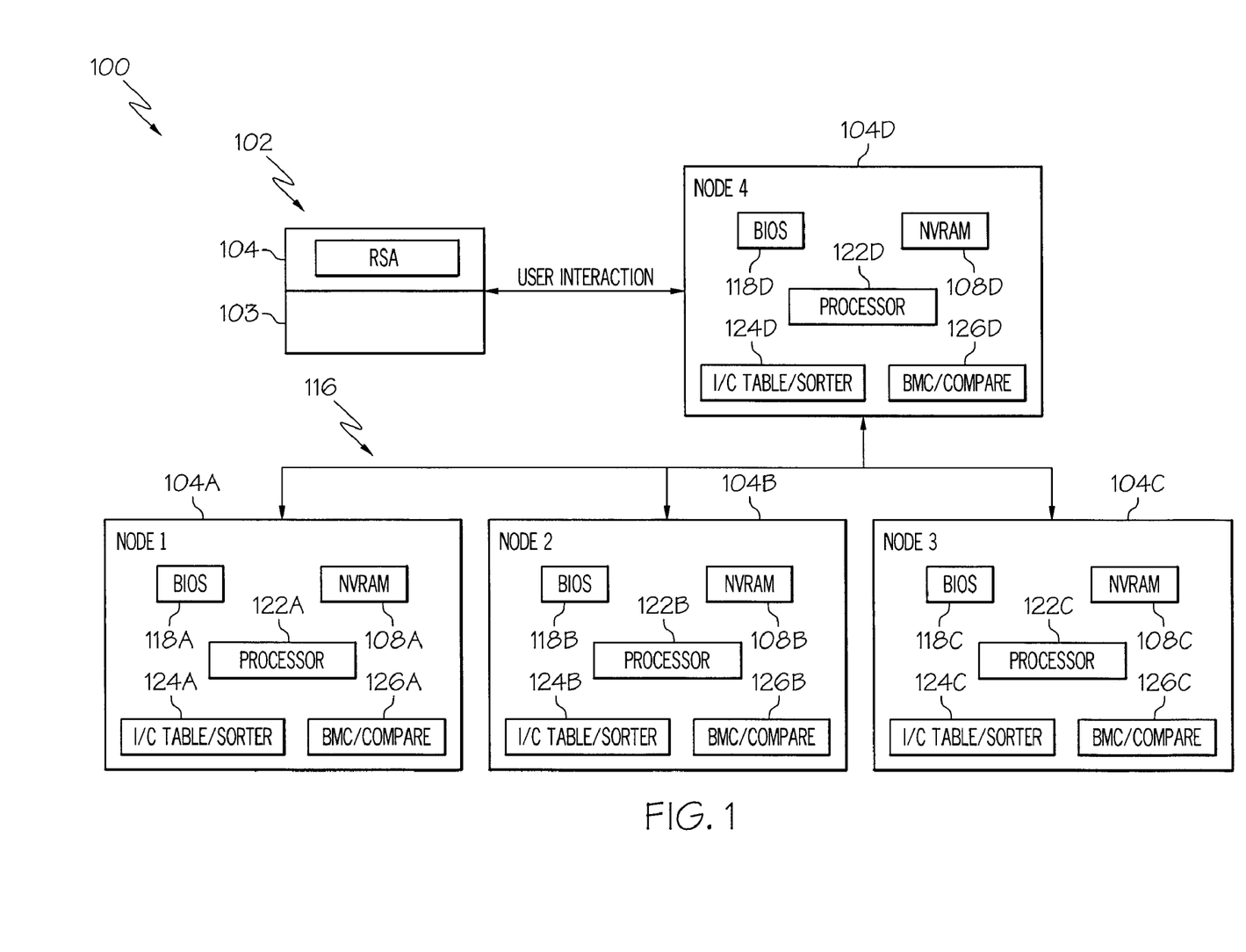
FIG. 1 is a block diagram of an auto-configuring merged system having a number of nodes.

Referring to FIG. 1, a processing system 100 that can auto-merge nodes and auto-configure partitions to a predetermined configuration is illustrated. In some embodiments, the components of the system 100 can be cabled together and the system can be connected to a power source or have power applied, and after power is applied or a power cord is plugged in, the system 100 can seamlessly integrate itself into a single partition system without user intervention. In some embodiments, additional computing resources can be connected when the system is operating, and the system can integrate or merge the newly connected node "on the fly." In this auto-partitioning process, the system 100 can set up as a single-partition system that runs a single instance of an operating system (OS), (hence referred to as a single partition system). The system 100 can include many nodes, such as nodes 104A, 104B, 104C and 104D (referred to herein collectively as nodes 104) as where each node can be a processing resource such as a scalable server. However, this disclosure is not limited to any fixed number of nodes or any type of processing resource. Thus, nodes 104 can represent any resource such as a peripheral device or processing resource that can be scaled.

As can be appreciated, the nodes 104 may include other components in addition to and/or in lieu of those depicted. Furthermore, nodes 104 are meant as representative of one type of node in conjunction with which embodiments can be implemented. Embodiments of the system 100 are also amenable to implementation in conjunction with other types of nodes, as can be appreciated.

Nodes 104 can have ports (where the interconnect system 116 meets the node 104) and thus nodes can be coupled to one another via an interconnect system 116. The interconnect system 116 can be implemented via cabling where cables are plugged into "scalable ports" in the chassis or circuit boards of the nodes 104. A node 104 can send and receive set up information and commands from other nodes 104 via interconnect 116. The nodes 104, possibly servers, may physically be located within a single rack or the servers could be distributed over different server racks at various locations within the range of the interconnect system. Each node 104 can include a basic input/output system (BIOS) 118A, 118B, 118C and 118D (collectively as BIOS 118), non-volatile random-access memory (NVRAM) 108A, 108B, 108C, and 108D (collectively 108) and a node management controller such as a baseboard management controller (BMC)s 126A, 126B, 126C and 126D (collectively 126). The nodes 104 may also include components in addition to and/or in lieu of those depicted. For example, the BMCs 126 can have a compare module to compare self-discovered connections to data in the table 124.

A system owner, user, or system administrator can connect an input/output (I/O) device 102 such as a remote supervisor adapter (RSA) to a node such as node 104D to monitor configurations of the nodes 104 and of the system 100 generally. In some embodiments, using the I/O device 102, the administrator can select a primary node or change default system configurations to custom or user selected configuration, if desired. The RSA 102 can have a keyboard 103 and a display 104 and can be connected to any node 104 or to the interconnect 116. Via the I/O device 102, the user can interact directly with the BMCs 126 and can interact with the BIOS 118 and BIOS setup/start up instructions of each node 104. The BIOS 118 may be a set of instructions or routines that allow each node 104 to load instructions that dictate basic operating functions. Further the BIOS 118 routine can provide an interface between the operating system (OS) and the hardware, and can control at least some of the functionality of each node 104 and can control how nodes interact with each other for example share processing tasks.

In addition, the BIOS 118 can control self test and error detection including a power-on self test procedure, a node interconnect detection system, and can read partition configuration information from a primary BMC and reconfigure itself (or change what instructions are loaded) in preparation for partition based merging or nodes. The BIOS 118 can control the above mentioned functionality and additional functionalities and can operate at each mergable node 104. The functionality specified regarding the BIOS 118 could be performed by the BMCs 126 and the functionality describe as being performed by the BMC 126 could be performed by the BIOS 118 as well.

The NVRAM 108 can retain the BIOS contents even when power is not supplied to the node 104. The NVRAM 108 can also store the firmware for the processors 122A, 122B, 122C and 122D (collectively 122). The processors 122 can be a single processor, a series of processors or a multi-core processor.

As stated above, each BMC 126 can act as a facilitator of the auto-merging/auto-partitioning process and can interact with the BIOS 118 of each node. In some embodiments, the nodes 104 can be connected by data cables, and power cables can be connected to each node and then, without user intervention. After such physical connections are made, the BMCs 126 can automatically discover what connections exist and each node 104 can be configured by its BMC 126. Configuring a node can include configuring how the system boots and operates and how processing tasks are shared between the nodes.

The system can have preloaded instructions to merge all nodes together and to operate all nodes as a single partition system. The system can auto-configure in a "similar" way to what is referred to as a "plug and play" system in personal computer (PC) technology. Plug and play systems can configure newly connected devices with code that is managed by, or is part of the operating system. In contrast, in some embodiments of the disclosed arrangements the auto-configure portion of the system 100 may not be part of an operating system, but can be performed with a software layer that underlies the operating system and is transparent to many different operating systems, that are supportable by the system 100.

Thus, the operation and actions of an auto-merge system 100 can occur prior to the loading of the operating system code and can operate virtually transparent to the operating system. It can be appreciated that different operating systems can utilize the system 100 as a platform without affecting the system configuration settings such as the partitioning. The BMCs 126 can provide an interface mechanism for automatic recognition of connections for all nodes 104, partitioning for each node 104 for addressing each node 104 and for loading the BIOS for each node 104. This interface feature can provide the capability of transmitting or receiving partition configuration data and for dispersing the processing workload presented to the system 100. The BMCs 126 can also control the turn on, or turn off of various portions of the merged system 100, and the BMCs 126 can reset the processors 122 within the merged system 100.

As part of the auto-configuration process, each BMC 126 can perform an automated self-discovery for the presence of connected nodes 104 and each port of each node 104. During this connection discovery process, the BMCs 126 can create a connection matrix or connection table 124 representing the interconnection of the system 100. This self-discovery process can commence when power is connected to the nodes 104 even though the power switch is not turned on. The BMCs 226 can conduct a "system self-discovery" by automatically mapping the interconnect configuration when power is applied to each node 104 even through the power switch for the particular node is in an off state. Such a mapping configuration can be stored in the form of interconnect (I/C) tables 124A, 124B, 124C and 124D (collectively tables 124). The tables 124 can also have a sorter module such that the connection data entered into each table can be "identically" sorted or sorted according to the same instructions. For example, the connection data can be sorted according to a hierarchy of UUIDs. Further, after the mapping is complete, the BMCs 126 can configure the system 100 as a unitary or single partitioned system according to a default setting. In other embodiments, a default setting or a user configured setting can create multiple partitions.

In some embodiments, the self configuring/self merging system 100 does not require the user to input any values or provide any configuration data, and the coupled nodes 104 can communicate and exchange connection information and can configure a shared processing configuration and an addressing scheme such that the system 100 can operate as a homogenous system with minimal or without any user input. As stated above, it can be appreciated that this sub-OS plug and play arrangement can operate with many different operating systems as the self configuring set up can run "under" or transparently to whatever operating system is installed on the system 100. Thus, the described sub-OS, plug and play system provides a user friendly, "hands off" solution to scalable system management of nodes.

As stated above, the system 100 can automatically configure instructions to operate cabled nodes 104 where multiple nodes can create a system 100 that appears to operate or work as a single system or single unit. The system 100 can assign unique identifiers to each port of each node such that each table 124 is identical. From the factory, each component (that is connected as a node) can have a universally unique sixteen byte identifier. The BMC 126 can get the identifier by querying the node or port and organize the table 124 in a hierarchy according to the numeric, alpha or alpha numeric magnitude of the identifier. Thus, all tables generated should have the same components in the same order. The interconnect data can be codified in a table format. Since a unique sixteen byte identifier has more bits than are needed for addressing communications between the small number of ports or nodes of the system 100, after the table is generated each node can be assigned an index possibly a four bit unique identifier where the index could start at "00" counting up where the last node (component with the highest or lowest factory assigned identifier) could have an "03" index where four nodes were present in the system 100. In some embodiments, eight or more nodes can be accommodated.

This unique index can be utilized as an address and allow all of the scalable sub-components or nodes 104 to communicate with each other by using the index/address in a header of transmissions. Each node 104 of the scalable systems can determine and generate a table where each sub-component should, when connected and operating properly, build or create the same table during the connection discovery process. Thus, because the nodes 104 can order the hardware in the same manner and assign consecutive numbers to the ordered hardware, identical tables 124 can be generated. When tables 124 are not substantially identical, the BMCs 126 can recognize this, and can regenerate the tables until all BMCs 126 generate an "identical" table.

In some embodiments, when power is initially applied to a node 104 (with the power switch off), the BMC 126 can perform a software load from non-volatile memory and can conduct a self test by executing code within the BMC 126. After a successful self-test, each BMC 126 can initiate a self-configuration procedure, which can include a partitioning routine. Each BMC 126 can also query other BMCs and check for the presence of descriptors of connections (populated tables) via scalable interconnections with other nodes. The BMCs 126 can also monitor communications by reading addressing or header information in transmissions and can detect connection data. The connection data can indicate what nodes in the system 100 are cabled together, partitioned and communicating. If descriptors are detected during the initialization communications, the BMCs 124 of each board can begin a self-configuration process to verify the integrity of the descriptors. In some embodiments, the BMC 124 can check to make sure its nodes are connected to ports of other nodes and that the connection data matches what is indicated by the BMCs 124.

When power is applied to a BMC 124 at a node, the BMC 124 can determine if the system has a primary node operating or assigned. If the BMC 124 cannot find a preexisting primary node to "join," it can become a primary node for the new system. In some embodiments, a system can auto configure or auto determine a primary node based on a hierarchy of universally unique identifiers (UUIDs). For example, the BMC 126 associated with the highest valued UUID or lowest could be elected and recognized by all BMCs 126 as a primary node. Such a process could also occur when a primary node leaves the system or becomes inoperable.

If a port is unreachable or no connection is found, the port can be flagged as an un-operable or unconnected port. If there is a mismatch between the complex descriptor and the system connected to the local port, the system can proceed to conduct a self-configuration as described below. When all BMCs 124 determine that they have matching tables then system partition management may begin. A complex self-configuration can be performed by each BMC 124 to create the complex descriptor when the system is initially configured or when a connection is added or changed. Each node 104 can query all the nodes connected directly to its ports and can update a local copy of the complex descriptor with the discovered unique identifier.

In some embodiments each BMC 126 can perform a port query for ports that are not directly connected to the BMC but are "indirectly" connected to the BMC 126. By querying beyond the directly coupled ports, a BMC 126 can capture remaining unique identifiers for any other nodes in the system 100 or complex. This "hopping" inquiry process can produce a complete list of available systems for the complex where each node 104 is identified by the unique identifier.

Each node 104 can sort the list of unique identifiers in the complex descriptor. The index number into the sorted unique identifier list can become a unique node number that the nodes use to communicate with specific nodes 104 of the system 100. Each node 104 can search tables 124 for its unique identifier (index) and can assign its own node number to the index of the entry. The node number is sufficient for any node to communicate with any other node in the interconnected complex. Partition IDs can then be assigned to groups of nodes in the complex so that power control is coordinated within the partition group, thus permitting the partition to boot as a single OS. In some embodiments, the BMCs can assign a "special" value of (0xFF in hexadecimal) as a partition ID such that a communication can be sent to and received by any node in the system 100. Each system can check messages sent across the interconnect 116 for the special value (0xFF) and take action based on detecting such a value. When the message is directed to, or intended for all systems, each node can detect this special value and respond as if the message were directed individually to the node. In other embodiments, a message can be directed to a specific node, and the partition ID can exclusively assigned to a particular node. Each BMC 126 can verify the complex descriptor by sending the local port connections to all the other BMCs 126. Such sharing of information can ensure consistency in table data.

As stated above, traditional scalable systems can require an Ethernet connection at each node and can require a processing subsystem to configure system operation and to perform basic administrative functions. The disclosed embodiments with multiple scaled servers can perform without a centralized administrative system such as an RSA. Functions that were formerly performed by trained technician utilizing RSAs can be automated by the BMCs 126. For example, node IDs do not need to be generated, entered into the system and monitored by a trained technician at a RSA terminal. The disclosed system can automatically generate node IDs and provide continuous communication regarding the configuration of neighboring scalable nodes or systems.

A processing complex, (a conceptual whole made up of related subsystems) can be considered as the set of scalable sub-systems cabled together where multiple servers can be auto-configured and run one or more operating systems. Alternately described, the server complex shown can have one or more partitions or run as one or more system. The system can utilize a "complex" descriptor to administrate the auto-connection/configuring and auto-partitioning of the complex/system. The complex descriptor can be a data structure that describes each node of the scalable systems capabilities and how each node is connected. In some embodiments, the system can automatically partition itself utilizing a single partition default setting. A partition can be considered as a group of the scalable systems cabled together and configured to run a single entity. For example, a scaled system having multiple nodes can run a single operating system.

In some embodiments, the system 100 can boot as a single partition system where a primary node or a remote supervisor adaptor can transmit an original equipment manufacturer (OEM) intelligent platform management interface (IPMI) command to all BMCs 126. The IPMI command can be compliant with a partition protocol specified by a manufacturer. IPMI commands can control basic node processes and can be utilized as a communication forum for communication between nodes in a scaled server configuration. The IPMI commands can be sent over the system bus of a server and over network connections as well as over an independent, internal platform management bus (IPMB).

The BMC 126 of each node can send a boot command to other BMCs 126 at different nodes and the BMCs 126 at these different nodes can utilize the IPMI boot command to control the booting process of the system 100. Part of the booting process includes how the system as whole will be partitioned. In a default mode, the IPMI command can control the system such that it configures itself as a single partitioned system. Accordingly, the system 100 can automatically configure itself during a power up or a boot such that the system 100 can, as a default, configure itself as a single partition system. It can be appreciated that the system 100 may not require executing an OEM IPMI command in any node other than the primary node of the system during the initial BIOS execution to merge scalable nodes together. Accordingly in some embodiments when the command is received by the primary node, the primary node will propagate the command to all the remaining nodes, which will act as secondary nodes without user interaction.

A BMC 126 at a node that receives this OEM IPMI command can notify other scalable and connected BMCs 126 about the default partition setting and can communicate the identity of the primary or boot node to all BMCs 126. The BMC 126 at the primary node can be referred to as the primary BMC. The primary BMC or node can provide or activate a single image of the operating system to all nodes once power is applied to any of the BMCs 126. "Power being applied" suggests that a power cord is plugged into a power source, possibly into a wall outlet; however, the power switch need not be turned on at the node. This auto-partitioning or auto-configuring by the BMCs 126 can provide an efficient solution to setting up systems and saves time for a user. Further, this auto configuration can maximize system potential without having to hassle with providing detailed data to multiple parts of the system via user interfaces.

A processing complex can be thought of as a set of systems cabled together that can boot and then perform as a single entity. A single partition complex can be viewed as a complex setup to boot as a single entity and a two partition system can be viewed as a system that can operate as two entities. In some embodiments, the disclosed system is set up in a default mode to boot and operate as a single entity. To create this single default partition, a primary node can be designated with minimal user involvement. For example, a user may connect all the nodes together with cables, and send a single OEM IPMI command to one node or BMC in the complex. The user can apply power to any one node and the BMC and BIOS can identify the primary node and can boot and merge such that there is only a single image of the operating system. It can be appreciated that the user must connect the primary node to the node that is powered and that the primary node can communicate with the other scaled nodes via connections.

It can also be appreciated that, a single OEM IPMI command transmitted to all perspective merging nodes can create this default partition. A "descriptor" for the system can include a collection of information that allows for one node or system to understand how to communicate with other connected nodes via scalability ports and cables. The complex descriptor can include a partition descriptor, which can be a collection of information that allows for a group of nodes or components in a processing complex to know that they should configure and operate as a single identity.

To create or set up a default partition a user can send an OEM IPMI command to a BMC at one node via "out of band" communications. The out of band communications can be an RSA type Web Interface or any tool that can communicate with the RSA or the BMC remotely or outside of the communication channel internal to the scalable environment. This command can identify the primary or boot node and the default partition data can be distributed to all connected and powered nodes of the complex 100.

Figure 2:
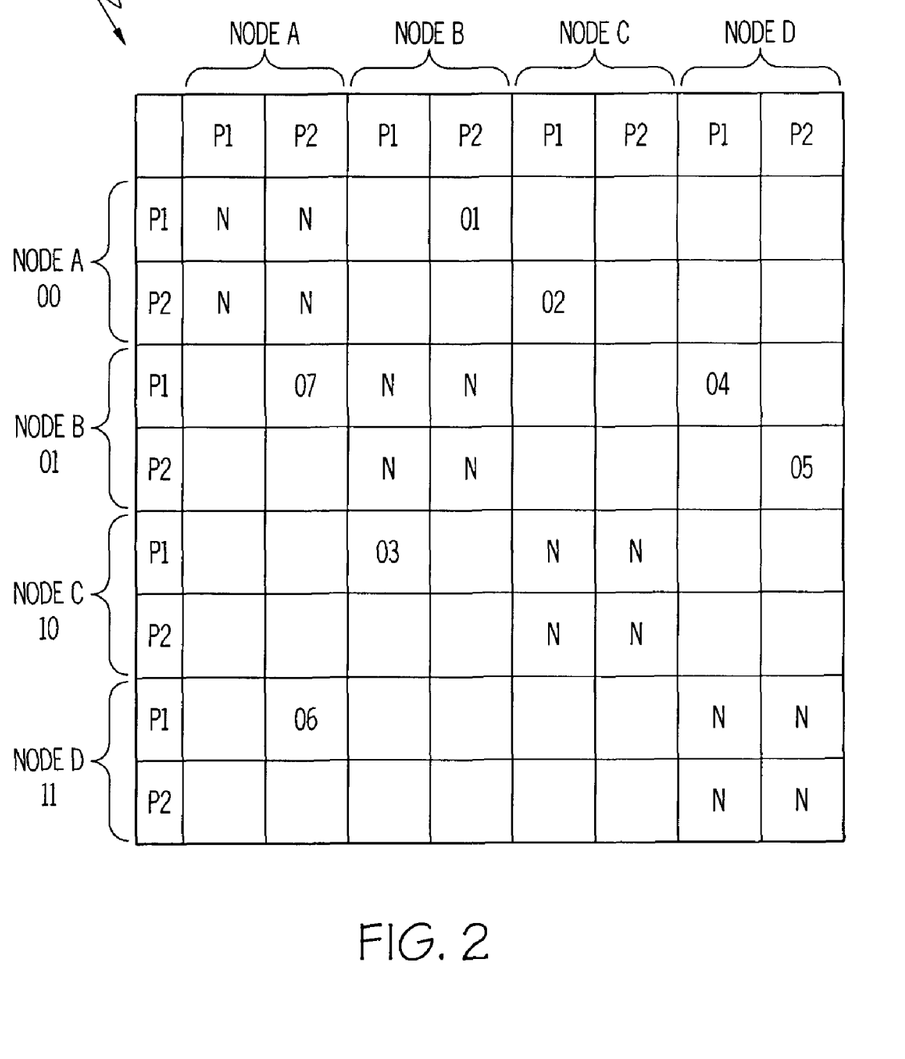
FIG. 2 is a table representing how nodes can be identified and connected.

Referring to FIG. 2, a table 200 of possible system interconnections that can be generated by a BMC is illustrated. Each component connected as a node that can be connected as a node can have a factory assigned unique sixteen byte identifier. The component can transmit this identifier in response to query's transmitted from other BMC or components and all BMCs can store these unique identifiers and sort them from high to low or low to high. Accordingly each BMC can organize the table 200 in the same order (i.e. from highest identifier value to lowest identifier value or lowest identifier at the top of the table and the highest valued identifiers at the bottom of the table).

This can be referred to as a sorting rating or ranking process. Using this hierarchy, each table created by each BMC can be substantially identical and should have substantially identical data. In the table 200 provided, a four node interconnect is illustrated where each node has two ports identified as P1 and P2.

In the table 200, N's are placed to indicate that this embodiment does not couple ports at the same node together although this could be done. In the table 200, node A has been assigned a unique identifier 00, node B 01, node C 10, and node D 11. Such identifiers could be utilized for addressing of communications. In addition, the unique connections between ports have been assigned a unique identifier. For example, the connection between node B port 1 and Node A port 2 has been assigned the unique identifier "07." As stated above, each BMC can access the tables stored by other BMCs to check specific connections or to compare every piece of data in one table to every piece of data in another table. Many other table configurations could be utilized without parting from the scope of this disclosure.

Further, as additional nodes are added to the system, the connections of the newly connected components or nodes can be automatically detected by all BMCs and the BMCs can configure/reconfigure the table 200 and the BIOS of all connected nodes such that they can function as one system. Thus, each node can automatically reconfigure, when a new node is added such that the newly connected resource can automatically and seamlessly integrate with existing operating resources. Scalability cables can be hot plugged, so that servers can be introduced into the complex and automatically detected while other systems are operational. The disclosed arrangements can also allow scalable server components to discover how to communicate with the other scalable systems without the requirement for the functions traditionally provided by a processing sub-system that is configured according to user input.

As stated above, traditional systems utilize a relatively complex and overhead intensive Ethernet connection to communicate set up information. Further, traditional systems require significant user input or user assistance to configure the system and make it operable. Generally, the disclosed scalable system is not limited by any particular operating system because the auto-merging can be performed transparently to the OS allowing the system to run many different operating systems.

The disclosed system can avoid the need to "check" through systems that cannot be scaled, such as those that appear through SLP discovery. A monitor for the system is not required, however if someone wants to view system settings, a monitor can be connected to the system. In addition, the systems and methods can free up Ethernet connections for other purposes and uses because only one node needs a terminal when someone wants to view how the system is set up for every node. The system does not need a smart terminal such as a RSA and does not need an Ethernet connection to communicate system configuration data.

Each scalable node can communicate with all the other scalable nodes through designated ports and cabling to build and populate the table. In some embodiments, the BMCs can provide management functions for the nodes and create control settings based on the contents of the table. To facilitate communication between the scaled nodes, the BMCs can create, assign and coordinate a unique identifier to each node and each port as shown at the left margin of the table. Such unique identifiers allow specific commands to be sent to specific systems and different commands to be sent to the different nodes. When a message is sent across the cabling, the nodes in the scalable system can know the intended recipient of the message by receiving the unique identifier and index (aka node ID) using the table 200 and by comparing the received identifiers to an identifier stored locally in the table 200.

Figure 3:
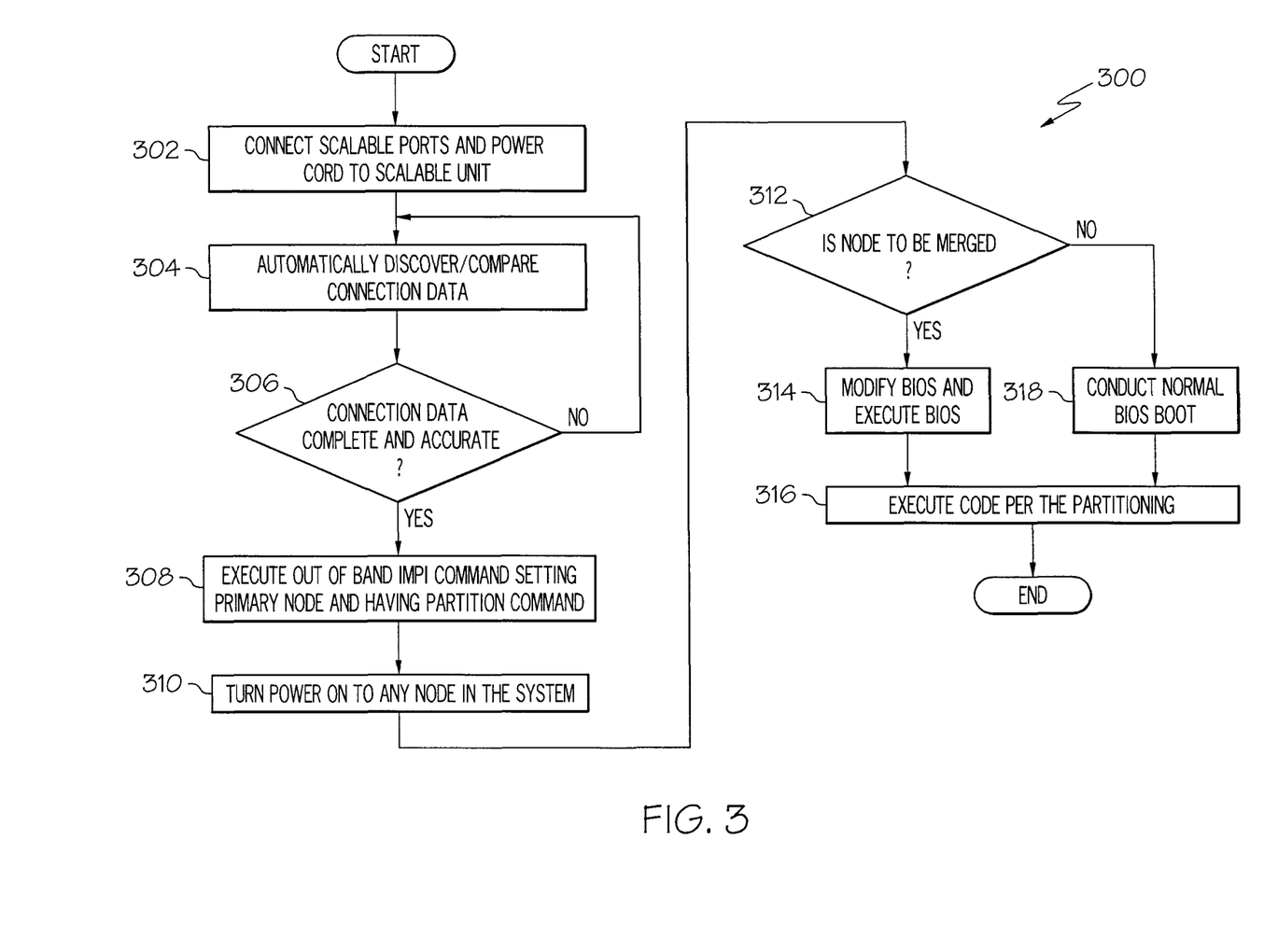
FIG. 3 is a flow diagram of a method of auto-configuring a scalable processing system.

Referring to FIG. 3, a flow diagram 300 of a method of auto-partitioning a scalable processing system or complex is disclosed. The method disclosed, as well as other methods of embodiments of the disclosure, may be wholly or partially implemented in conjunction with a computer-readable medium or a computer assisted article of manufacture. The computer-readable medium may be embodied as a recordable data storage medium, a modulated carrier signal, or another type of computer-readable medium.

As illustrated by block 302, nodes can be cabled together and power can be applied to the system (with the power switch off). After receiving power from some source, a node management controller or a baseboard management controller (BMC) can perform a software load from non-volatile memory and can conduct a connection testing procedure and can check to see if system descriptors are present for the connected system and if the descriptors match connection data that can be discovered, as illustrated by block 304. The BMC can also check and compare existing connection data to self-discovered connection data to determine if the data is accurate as illustrated by decision block 306. The descriptors of the processing complex can provide connection information stored by other BMCs in the complex that can already be cabled together, partitioned and communicating.

If a controller cannot ensure that the available information is accurate, cannot successfully determine that the stored connection data matches the discovered connection data, or cannot determine that tables have matching data, then the process can revert to block 304 where additional connection discovery can occur. When sufficient interconnection data is obtained, a BMC can execute an out of band IPMI command setting a primary node and providing partitioning instructions as part of an IPMI command as illustrated by block 308.

The IPMI commands can be sent over the system bus of a server and over network connections. For example in some embodiments the IPMI command can be sent over an independent, internal platform management bus (IPMB). To create or set up a default partition, a user can send an OEM IPMI command to a BMC at one node via "out of band" communications. The out of band communications can be from an RSA type Interface or an IPMI tool.

It can be appreciated that this "housekeeping" or system configuration set up can be done before power is applied to the system. The baseboard management controller (BMC) of a single node can send a boot command over to other BMCs at different nodes and the BMCs and these different nodes can utilize an IPMI boot command to boot the multi-node system uniformly. Further, the command can control the system such that it configures itself as a single partitioned system. Accordingly, the system can automatically configure itself during a power up or a boot such that the system can, as a default, configure itself as a single partition system.

As illustrated by block 310, power can be turned on to any node in the system. As illustrated by block 312, it can be determined if the subject node is merged and partitioned. If the node has been selected as part of a partition, the node can conduct a normal BIOS boot process as illustrated by block 318. If the node is not merged and partitioned then the BIOS can be modified and the BIOS can be executed as illustrated by block 314.

A BMC at a node that receives the OEM IPMI command can notify other scalable and connected BMCs about the default partition setting and can communicate the identity of the primary or boot node. The BMC at the primary node can be referred to as the primary BMC. The partitioning can then be executed as illustrated in block 316. The process can end thereafter.

As explained above, a user may connect many nodes together with cables, and send a single OEM IPMI command to one node or BMC in the complex. The user can apply power to any one node and the BMC and BIOS can identify the primary node and can boot and merge such that there is only a single image of the operating system. It can be appreciated that the user can connect the primary node to the node that is powered and that the primary node can communicate with the other scaled nodes via connections. It can also be appreciated that, a single OEM IPMI command transmitted to all perspective merging nodes can create this default partition. A "descriptor" for the system or the complex or a "complex descriptor" can include a collection of information that allows for one node or system to understand how to communicate with other connected nodes via scalability ports and cables. The complex descriptor can include a partition descriptor, which can be a collection of information that allows for a group of nodes or components in a processing complex to know that they should configure and operate as a single identity.

Reference to particular configurations of hardware and/or software, those of skill in the art will realize that embodiments of the present invention may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of computer readable storage devices. Illustrative computer readable storage devices include, but are not limited to: (i) information permanently stored on non-writable storage media (e.g., read-only memory devices within a computer such as CD-ROM disks readable by a CD-ROM drive); and (ii) alterable information stored on writable storage media (e.g., floppy disks within a diskette drive or hard-disk drive). Such computer readable storage devices, when carrying computer-readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this document that the present disclosure contemplates methods, systems, and media that provide an auto partitioning system. It is understood that the form of the invention shown and described in the detailed description and the drawings are to be taken merely as examples. It is intended that the following claims be interpreted broadly to embrace all the variations of the example embodiments disclosed.

What is claimed is:

1. A method for configuring a processing system comprising:
   determining connection data of the processing system automatically by communicating with at least one node in the processing system, wherein the connection data consists of what nodes are cabled together, partitioned and in communication to yield interconnect data, and further wherein the interconnect data results from communications through a node management controller particular to each node;
   designating, subsequent to the determining, a primary node of the processing system, wherein the processing system is scalable;

transmitting a partition command, automatically from the primary node to the at least one node, in response to the connection data and the designated primary node, the partition command having booting instructions for the at least one node; and whereby the method obviates a need for a smart terminal and Ethernet connection to communicate the connection data in order to achieve a resultant single-partition system.

2. The method of claim 1, further comprising accepting user input to designate the primary node.

3. The method of claim 1, wherein the primary node transmits the partition command to at least one secondary node.

4. The method of claim 1, further comprising configuring a basic input output system in response to the partition command.

5. The method of claim 1, wherein the partition command is an intelligent platform management interface (IPMI) command.

6. The method of claim 5, wherein the IPMI command complies with an original equipment manufacturer (OEM) IPMI command.

7. The method of claim 5, wherein the IPMI command is transmitted as an out of band transmission.

8. The method of claim 1, further comprising automatically booting the system in response to an application of power.

9. The method of claim 1, wherein designating the primary node is performed automatically responsive to a presence of power at the primary node.

10. The method of claim 1, further comprising detecting a new node that is hot plugged and transmitting configuration instructions to the new node.

11. The method of claim 1, further comprising performing partitioning functions when a power switch supplying the node is in an off position.

12. A computer system for configuring a processing system, the system comprising:
a processor, a computer readable memory and a computer readable storage device;
first program instructions to determine connection data of the processing system automatically by communicating with at least one node in the processing system, wherein the connection data consists of what nodes are cabled together, partitioned and in communication to yield interconnect data, and further wherein the interconnect data results from communications through a node management controller particular to each node;
second program instructions, performed subsequent to the first program instructions, to designate a primary node of the processing system, wherein the processing system is scalable;
third program instructions to transmit a partition command, automatically from the primary node to the at least one node, in response to the connection data and the designated primary node, the partition command having booting instructions for the at least one node;
wherein the first, second, and third program instructions are stored on the computer readable storage device for execution by the processor via the computer readable memory; and
whereby the system obviates a need for a smart terminal and Ethernet connection to communicate the connection data in order to achieve a resultant single-partition system.

13. The system of claim 12, further comprising fourth program instructions to accept user input to designate the primary node; and wherein the fourth program instructions are stored on the computer readable storage device for execution by the processor via the computer readable memory.

14. The system of claim 12, further comprising fourth program instructions to configure a basic input output system in response to the partition command; and wherein the fourth program instructions are stored on the computer readable storage device for execution by the processor via the computer readable memory.

15. A computer program product for configuring a processing system, the computer program product comprising:
a computer readable storage device;
first program instructions to determine connection data of the processing system automatically by communicating with at least one node in the processing system, wherein the connection data consists of what nodes are cabled together, partitioned and in communication to yield interconnect data, and further wherein the interconnect data results from communications through a node management controller particular to each node;
second program instructions, performed subsequent to the first program instructions, to designate a primary node of the processing system, wherein the processing system is scalable;
third program instructions to transmit a partition command, automatically from the primary node to the at least one node, in response to the connection data and the designated primary node, the partition command having booting instructions for the at least one node;
wherein the first, second, and third program instructions are stored on the computer readable storage device; and
whereby the computer program product obviates a need for a smart terminal and Ethernet connection to communicate the connection data in order to achieve a resultant single-partition system.

16. The computer program product of claim 15, further comprising fourth program instructions to accept user input to designate the primary node; and wherein the fourth program instructions are stored on the computer readable storage device.

17. The computer program product of claim 15, further comprising fourth program instructions to configure a basic input output system in response to the partition command; and wherein the fourth program instructions are stored on the computer readable storage device.

18. The computer program product of claim 15, further comprising fourth program instructions to automatically boot the system in response to an application of power; and wherein the fourth program instructions are stored on the computer readable storage device.

19. The computer program product of claim 15, further comprising fourth program instructions to detect a new node that is hot plugged and transmitting configuration instructions to the new node; and wherein the fourth program instructions are stored on the computer readable storage device.

20. The computer program product of claim 15, further comprising fourth program instructions to perform partitioning functions when a power switch supplying the node is in an off position; and wherein the fourth program instructions are stored on the computer readable storage device.

* * * * *